US012785742B2

(12) United States Patent
Lorenz et al.

(10) Patent No.: US 12,785,742 B2
(45) Date of Patent: Nov. 3, 2026

(54) METHODS AND APPARATUSES FOR ADAPTIVE SUB-BAND FILTERING

(71) Applicant: The Government of the United States, as represented by the Secretary of the Navy, Washington, DC (US)

(72) Inventors: Kevin Lorenz, Greenbelt, MD (US); Joel Goodman, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 160 days.

(21) Appl. No.: 18/242,128

(22) Filed: Sep. 5, 2023

(65) Prior Publication Data

US 2023/0421190 A1 Dec. 28, 2023

Related U.S. Application Data

(63) Continuation of application No. PCT/US2022/018922, filed on Mar. 4, 2022.

(60) Provisional application No. 63/156,552, filed on Mar. 4, 2021.

(51) Int. Cl.
*H04B 1/12* (2006.01)
*H04B 1/7105* (2011.01)
*H04L 25/03* (2006.01)

(52) U.S. Cl.
CPC ......... *H04B 1/123* (2013.01); *H04B 1/71055* (2013.01); *H04L 25/03006* (2013.01); *H04L 2025/03636* (2013.01)

(58) Field of Classification Search
CPC .......... H04B 1/12; H04B 1/123; H04B 1/525; H04B 1/71055; H04L 2025/03636; H04L 25/03006
See application file for complete search history.

(56) References Cited

U.S. PATENT DOCUMENTS

| | | | |
|---|---|---|---|
| 7,733,994 | B2 | 6/2010 | Chan |
| 9,036,749 | B2 | 5/2015 | Choi |
| 9,184,902 | B2 | 11/2015 | Khojastepour |
| 10,284,356 | B2 | 5/2019 | Bharadia |

(Continued)

FOREIGN PATENT DOCUMENTS

| | | | | |
|---|---|---|---|---|
| CN | 111181531 A * | 5/2020 | ......... | H03H 21/0043 |
| WO | WO-2018153439 A1 * | 8/2018 | ............. | H04B 1/525 |

OTHER PUBLICATIONS

International Search Report of International Application No. PCT/US22/18922, dated Sep. 9, 2022, 3 pages. (Year: 2022).*

(Continued)

*Primary Examiner* — Nader Bolourchi
(74) *Attorney, Agent, or Firm* — US Naval Research Laboratory; Scott C. Hatfield

(57) ABSTRACT

Methods and systems for identifying a signal-of-interest in an over-the-air signal that includes a self-interfering signal. The over-the-air signal and the transmitted signal are sampled and passed to an adaptive filter. The adaptive filter processes a plurality of samples in parallel. The samples are subbanded by passing through an analysis filter, down-sampled, and then used to update the adaptive filter coefficients. The updated filter coefficients may be updated based on a variable step-size that decreases as the system converges or a fixed step-size.

8 Claims, 12 Drawing Sheets

(56) References Cited

U.S. PATENT DOCUMENTS

| | | | | |
|---|---|---|---|---|
| 10,924,256 | B2 | 2/2021 | Jana | |
| 2017/0188264 | A1* | 6/2017 | Hwang ................ | H04B 1/1027 |
| 2020/0343934 | A1* | 10/2020 | Weissman ............ | H04B 1/0032 |

OTHER PUBLICATIONS

Written Opinion of International Application No. CON of PCT/US22/18922, dated Sep. 9, 2022, 3 pages. (Year: 2022).*

English translation of Chinese patent publication of Suzhou University (CN 111181531 A) (Year: 2020).*

McMichael, J.G., et al. "Optimal tuning of analog self-interference cancellers for full-duplex wireless communication," 15th Annual Allerton Conference on Communication, Control, and Computing, Allerton House, Illinois, USA, pp. 246-251, Oct. 1-5, 2012.

Kolodziej, K.E., et al., "In-band full-duplex technology: Techniques and systems survey," IEEE Transactions on Microwave Theory and Techniques, vol. 67, No. 7, pp. 3025-3041, Jul. 2019.

Decourville, M., et al., "Adaptive filtering in subbands using a weighted criterion," IEEE Transactions on Signal Processing, vol. 46, No. 9, pp. 2359-2371, Sep. 1998.

Pradham, S.S., et al., "A new approach to subband adaptive filtering," IEEE Transactions on Signal Processing, vol. 47, No. 3, pp. 655-664, Mar. 1999.

Kim, S., et al., "Alias-free subband adaptive filtering with critical sampling," IEEE Transactions on Signal Processing, vol. 56, No. 5, pp. 1894-1904, May 2008.

Chan, K.S., et al., "Analysis of the frequency-domain block LMS algorithm," 2000 IEEE International Conference on Acoustics, Speech, and Signal Processing, vol. 1, 2000, pp. 380-383, Jun. 5-9, 2000.

Lorenz, K.S., et al., "A Real-Time Wideband Data-Adaptive Subband LMS Algorithm for Full-Duplex Communications," IEEE Access, vol. 10, pp. 32566-32573, Mar. 22, 2022.

* cited by examiner

300

400

FPGA RESOURCE USAGE

| Resource | Usage | Percentage |
|---|---|---|
| LUT | 46575 | 3% |
| LUTRAM | 1643 | 1% |
| FF | 84308 | 2% |
| BRAM | 2 | 1% |
| DSP | 4781 | 39% |

*FIG. 9A*

FPGA RESOURCE USAGE

| Resource | Usage | Percentage |
|---|---|---|
| LUT | 78327 | 18% |
| LUTRAM | 23033 | 11% |
| FF | 146675 | 17% |
| BRAM | 26 | 2% |
| DSP | 2984 | 70% |

*FIG. 9B*

METHODS AND APPARATUSES FOR ADAPTIVE SUB-BAND FILTERING

CROSS REFERENCE TO RELATED APPLICATIONS

This application claims the benefit of U.S. Provisional Patent Application No. 63/156,552, filed Mar. 4, 2021, the contents of which are incorporated by reference herein in their entirety.

BACKGROUND

Field of the Invention

The present application relates generally to methods and apparatuses for adaptive filtering.

Description of Related Art

Smartphones have become ubiquitous in modern life. Smartphones connect to each other and other devices over a cellular network. Early cellular networks were limited to relatively slow communications. In fact, first generation ("1G") cellular networks did not account for data transfer. The first second-generation ("2G") cellular network appeared in 1991 and allowed for simple data services, namely short message services (SMS). 2G offered a theoretical maximum transfer speed of just 40 kbit/s. Today, fifth-generation ("5G") networks have been deployed with download speeds of up to 1.0 Gbit/s. In-band full duplex (IBFD) communications has the potential to nearly double the spectrum efficiency of existing 5G communications. Full duplex communications means that data can be sent and received at the same time, as opposed to being limited to sending or receiving at one time. Full duplex communications typically require some form of digital cancellation to mitigate interference that is created by transmitting and receiving signals at the same time using the same frequency band. 5G presents some unique challenges to conventional cancellation techniques. First, wireless data transfer must occur in as much as 400 MHz of instantaneous bandwidth. With the potential for root mean square (RMS) delay spreads of 100-300 ns and sample rates in excess of 1.0 gigasamples per second (Gsps), a digital canceler using a finite impulse response (FIR) filter with several hundred coefficients may be needed to suppress self-interference. These difficulties, along with a relatively short coherence time, make the task of implementing a real-time canceler in digital hardware that is capable of tracking a rapidly changing channel a significant challenge and one that conventional implementations have been unable to satisfactorily address. Thus, it would be desirable to have a system for cancelling unwanted signals that can mitigate or overcome some of these challenges.

SUMMARY OF THE INVENTION

One or more of the above limitations may be diminished by the structures and methods described herein.

In one embodiment, a method is provided. In another embodiment, an apparatus is provided. An over-the-air signal comprising a signal-of-interest and a self-interfering signal is received and sampled to generate a digital over-the-air signal. A transmitted signal is sampled to generate a digital transmitted signal. The self-interfering signal is correlated to the transmitted signal. A series of steps are repeated to allow a mean-square error to converge to a steady-state value. A plurality of error signals respectively corresponding to R samples of the digital over-the-air signal are generated by, for each of the R samples, subtracting an approximation of the over-the-air signal from the corresponding digital over-the-air signal. The plurality of error signals and the digital transmitted signal are sub-banded, in parallel, using an analysis filter for N sub-bands to generate a plurality of sub-banded digital error signals and a plurality of sub-banded digital transmitted signals. The plurality of sub-banded digital error signals are then downsampled by N to generate a plurality of downsampled sub-banded digital error signals. A plurality of adaptive filter coefficients are then updated based on: (i) the plurality of downsampled sub-banded digital error signals, (ii) the plurality of sub-banded digital transmitted signals, and a step-size coefficient. The approximation of the over-the-air signal is then updated. When the mean square error converges to a steady-state value, an approximation of the signal-of-interest is generated by subtracting a current approximation of the over-the-air signal from the digital over-the-air signal.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9A and 9B shows the FPGA resources consumed for an exemplary system 200 implemented on different FPGAs;

Figure 1:
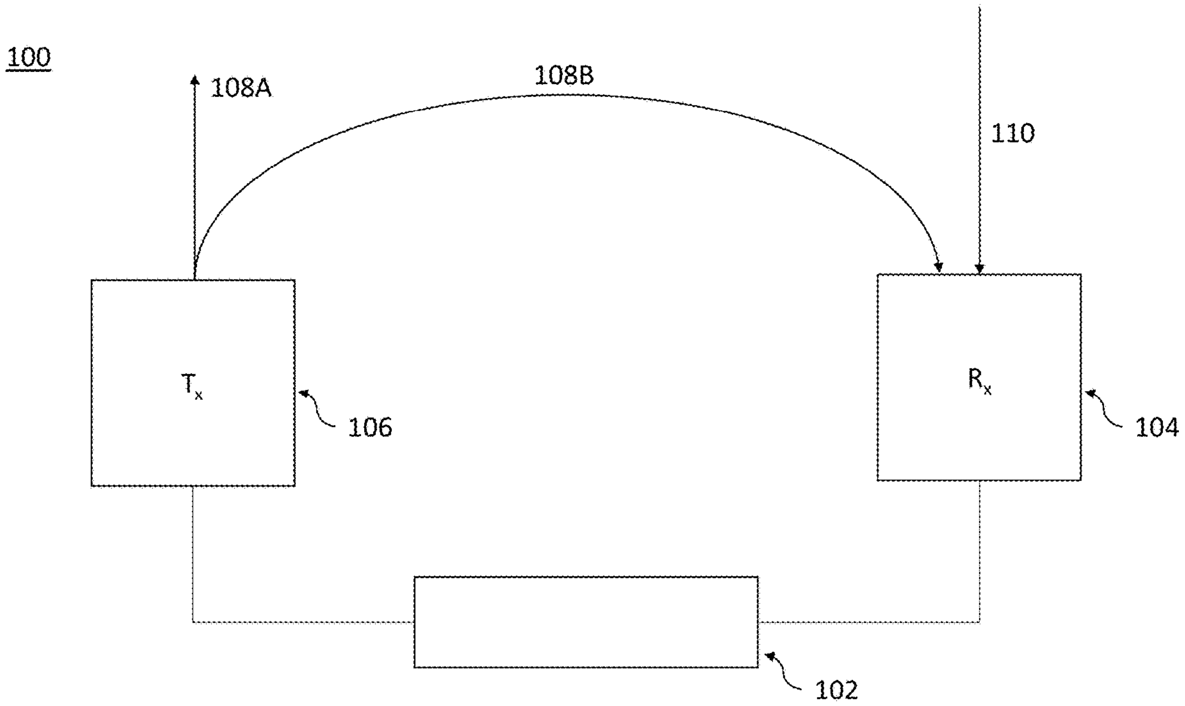
FIG. 1 illustrates the problem of self-interference for a system 100.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects, described herein are methods and apparatuses for adaptive filtering. FIG. 1 illustrates the problem of self-interference for a system 100 that is constructed to transmit and receive signals at the same time and using the same frequency band. Under the control of a controller 102, a transmitter 106 transmits a signal 108A. At the same time, a receiver 104 receives a signal-of-interest (SOI) 110 that is in the same frequency band. However, since the transmitter 106 is transmitting at the same time receiver 104 is receiving, receiver 104 may also receive a signal 108B that is correlated to the transmitted signal 108A. The surrounding environment affects the transmitted signal 108A causing it to change in an unknown way, resulting in signal 108B which is different but correlated to the transmitted signal 108A. Thus, one cannot simply subtract the known transmitted signal 108A from the total signal received by receiver 104 to arrive at SOI 110. Instead, one must cancel the correlated self-interfering signal 108B. This condition is commonly referred to as "self-interference" and without appropriate correction may obscure the SOI 110. This is especially true considering the power of signal 108B is usually much larger than the power of the SOI 110.

Figure 2:
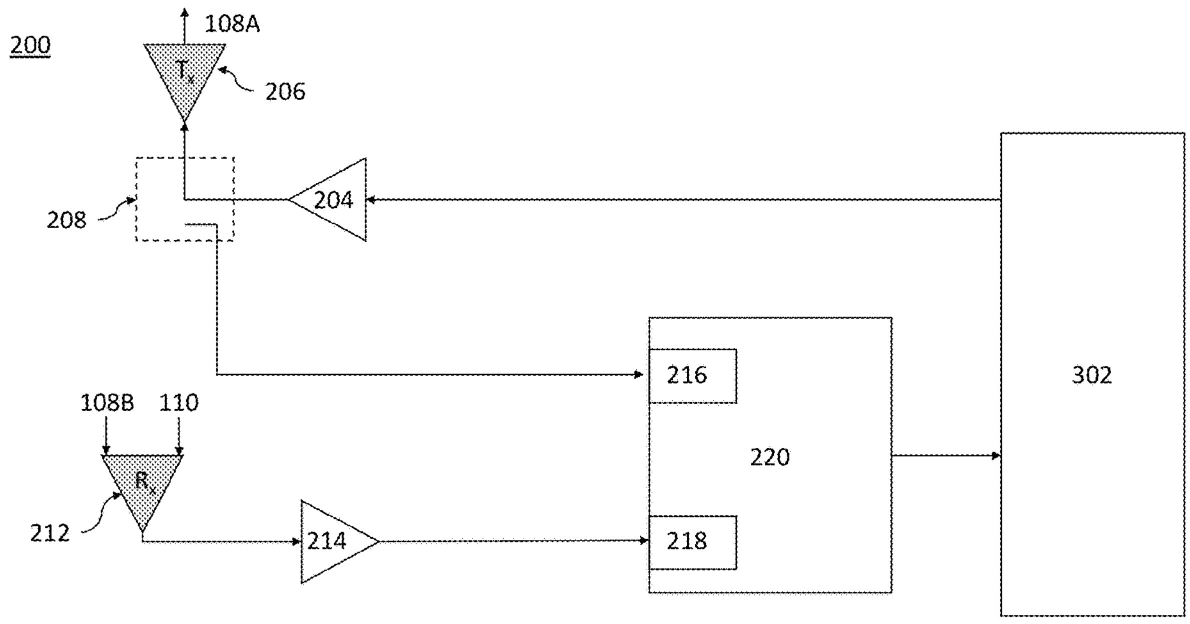
FIG. 2 is a schematic diagram of a system 200 for transmitting and receiving signals.

FIG. 2 is a schematic diagram of a system 200 for transmitting and receiving signals. A controller 302 (FIG. 3) outputs a signal for transmission and is constructed to receive the output of a subband adaptive filter (SAF) 220. Both controller 302 and SAF 220 may be part of a larger system, as explained below in reference to FIGS. 3 and 4.

Figure 3:
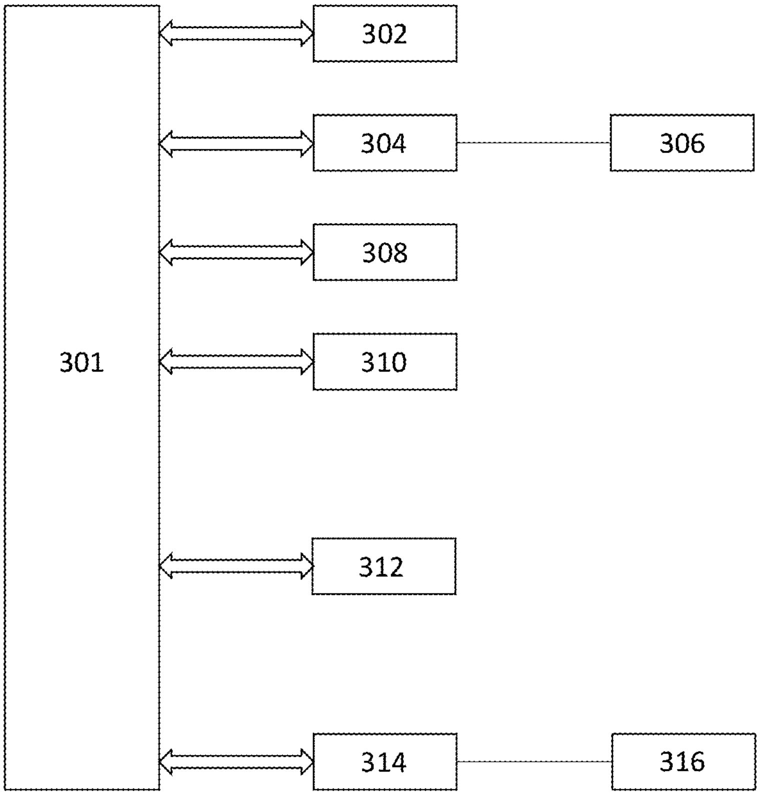
FIG. 3 is a schematic diagram of an exemplary system 300.

FIG. 3 is a schematic diagram of an exemplary system 300 that includes controller 302 and other components. In one embodiment, system 300 is an interactive user device that is constructed to connect to a cellular network, e.g., a smartphone, computer, tablet, or the like. In another embodiment, system 300 may be a cellular transmission tower for communicating with smartphones and other components of a cellular network, such as a 5G network. Controller 302 may be a central processing unit, a multiple processing unit, an application-specific integrated circuit (ASIC), a field-programmable gate array (FPGA), or the like. Controller 302 may be connected to a communication infrastructure 301 that allows controller 302 to send and receive data or information. Some examples of communication infrastructure 301 include a communications bus, a cross-over bar device, or a computer network.

In the case where system 300 is constructed for interactive operation with a user (e.g., a smartphone, computer or table), system 300 may include a display interface 304 (or other output interface) that forwards video, graphics, text, and other data from the communication infrastructure 301 (or from a frame buffer (not shown)) for display on a display 306. For example, the display interface 304 can include a graphics card with a graphics processing unit.

System 300 may also include an input unit 308 that can be used by a user to send information to controller 302 via the communication infrastructure 301. In one example embodiment herein, the input unit 308 can include a physical or virtual keyboard and/or a mouse device or other input device. In one exemplary embodiment, the input unit 308 and display 306 can be combined to form a user interface, e.g., a touchscreen. In such an embodiment, a user touching the display 306 can cause corresponding signals to be sent from the display 306 to the display interface 304, which can forward those signals to controller 302 for processing.

System 300 includes memory 310. Depending on the intended use of system 300, the type and size of memory 310 may vary. For example, if system 300 is a smartphone, computer, or tablet, memory 310 may be random access memory ("RAM"). System 300 may also include secondary memory 312. The secondary memory 312 can include one or more of, for example, hard disk drives, solid state drives, or a removable-storage drive (e.g., a floppy disk drive, a magnetic tape drive, an optical disk drive, a flash memory drive, and the like). In one embodiment, program instructions for operating system 300 may be stored in main memory 310, second memory 312, or both. Main memory 310 and second memory 312 may also be used to store data or other information generated during execution of those program instructions, or received from an external source.

Figure 4:
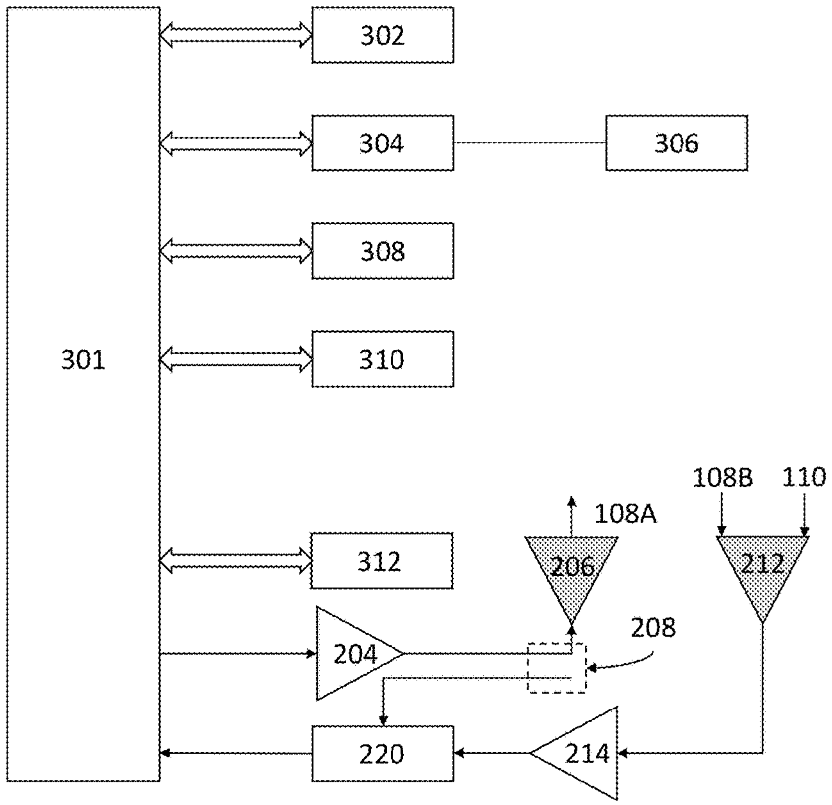
FIG. 4 is a schematic diagram of an exemplary system 400 that includes features of system 200.

To facilitate communication with external sources and devices, system 300 may also include one or more communications interfaces 314. The communication interface 314 allows for software, data, program instructions, and other information or signals to be sent or received. Exemplary communication interfaces that may be provided include: a modem, a cellular modem, a network interface (e.g., an Ethernet card or an IEEE 802.11 wireless LAN interface), a communications port (e.g., a Universal Serial Bus ("USB") port or a FireWire® port), a Personal Computer Memory Card International Association ("PCMCIA") interface, and the like. As shown in FIG. 4, transmitter 206, receiver 212, SAF 220, and other features shown in FIG. 2 may be considered a communication interface 314 allowing for simultaneous sending and receiving of signals. Software and data transferred via a communication interface 314 can be in the form of signals, which can be electronic, electromagnetic, optical or another type of signal that is capable of being transmitted and/or received by the communication interface 314. Having described system 300 and its exemplary components, attention will now be directed back to FIG. 2.

As shown in FIG. 2, controller 302 may, via communication infrastructure 301, cause a transmitter 206 to transmit a signal 108A. In a preferred embodiment, the signal generated by controller 302 first passes through a power amplifier 204 to increase the signal's power. The amplified signal then passes to a coupler 208 such as the RF-Lambda RFDC5M18G30 which allows the amplified signal to pass to the transmitter 206 but also directs an attenuated copy of that signal to a reference channel (REF) of SAF 220. SAF 220 may include an analog-to-digital converter 216 which, generates a digital sample x(n) of the analog signal 108A. Receiver 212 receives an "over-the-air" (OA) signal that includes the correlated interfering signal 108B and SOI 110 and passes the same to a low-noise amplifier 214 which in turns passes those signals to an over-the-air (OA) channel of SAF 220. As above, SAF 220 may include an analog-to-digital converter 218 which, under the control of a controller included in SAF 220, or the control of controller 302, generates a digital sample of the OA signal. Having described the features of FIG. 2, attention will now be directed to the operation of SAF 220.

Figure 5:
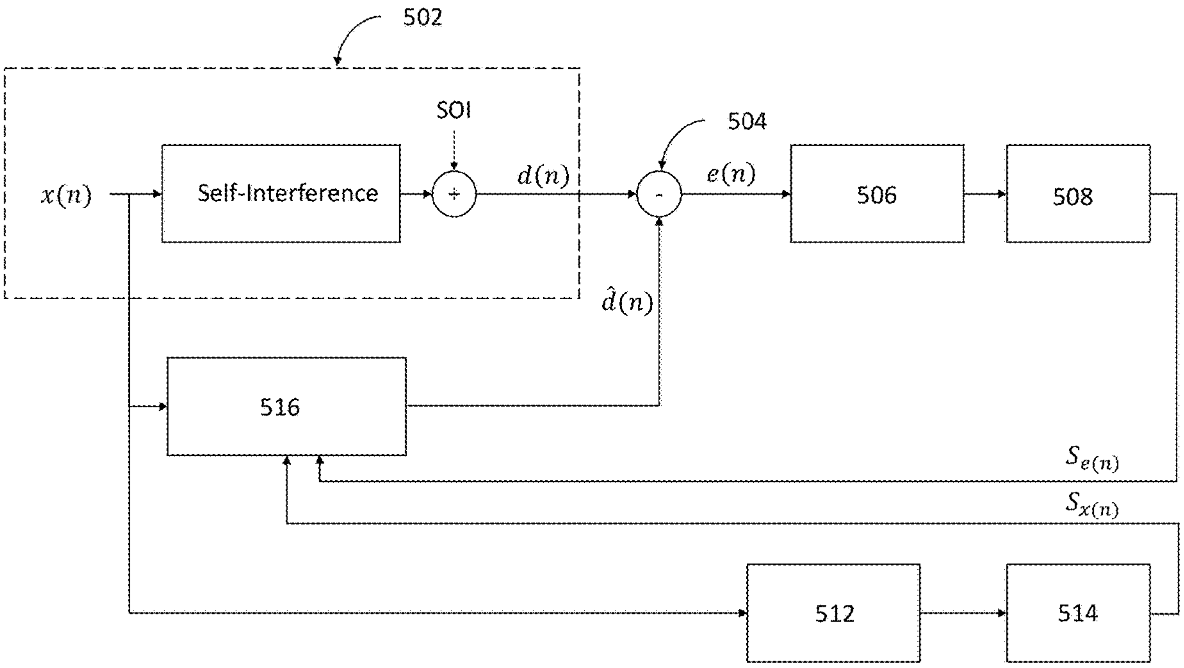
FIG. 5 depicts the operation of SAF 220 according to one embodiment.

FIG. 5 depicts the operation of SAF 220. As discussed above, signal 108A is distorted by the environment and transformed into a correlated signal 108B which is received, along with SOI 110, at receiver 212 where it is digitally sampled to form OA signal d(n). This process is illustrated in box 502 where the transmitted signal x(n) is mutated by an unknown, self-interfering system—representing the environmental affects—combined with the SOI 110, and then digitally sampled to form OA signal d(n). Subtractor 504 then subtracts an approximation $\hat{d}(n)$ from the digitally sampled signal d(n). The approximation $\hat{d}(n)$ is generated by an adaptive filter 516, as described below, however the initial approximation $\hat{d}(n)$ is likely quite different from OA signal d(n). As a result, an error signal e(n) is output from the subtractor 504 and may be defined as follows:

$$e(n) = d(n) - \hat{w}^T(n-1)x(n) \qquad \text{Equation 1}$$

In Equation 1, ŵ denotes the vector of adaptive filter coefficients employed by the adaptive filter 516, and T denotes the vector transpose operation. In a preferred embodiment, the error signal e(n) is then subjected to subbanding and downsampling operations. As one of ordinary skill will appreciate, subbanding refers to the process of dividing a signal corresponding to a certain overall bandwidth into a plurality of signals respectively corresponding to different segments of the overall bandwidth. Downsampling refers to discarding a specified number of digital samples in a digital signal so as to reduce its data rate while retaining sufficient information to reconstruct the original analog signal.

Figure 6:
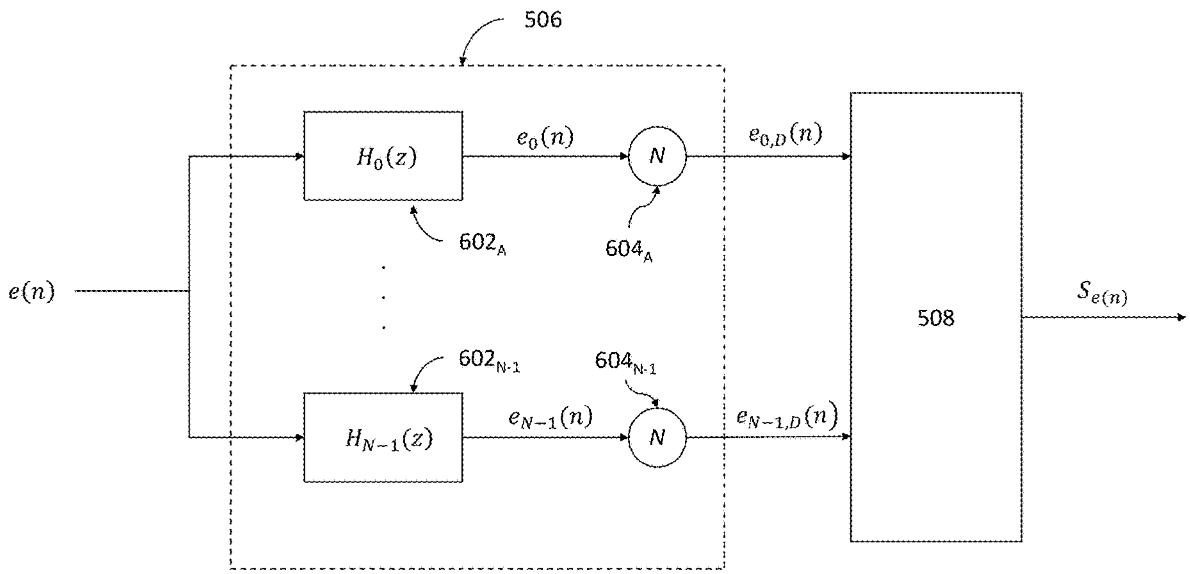
FIG. 6 depicts the sub-banding and downsampling operations for one or more error signals, according to one embodiment.

FIG. 6 illustrates the sub-banding and downsampling operations for the error signal e(n). First, the error signal e(n) is passed through a series of analysis filters $\mathbf{602}_A \ldots \mathbf{602}_{N-1}$ or $H_0(z) \ldots H_{N-1}(z)$ (generically $\mathbf{602}_n$ and $H_k(n)$) where N denotes the number of sub-bands, resulting in a corresponding series of sub-banded error signals $e_0(n) \ldots e_{N-1}(n)$ (generically $e_k(n)$). Each of the analysis filters $\mathbf{602}_n$ has a corresponding impulse response $h_k(n)$. The design of system 200 allows a user to select their preferred filter bank architecture. One exemplary filter bank architecture is a generic cosine filter bank based on T. Q. Nguyen, *A class of generalized cosine-modulated filter bank*, Proceedings of the IEEE International Symposium on Circuits and Systems (ISCAS), vol. 2, 1992, pp. 943-946 with a prototype filter based on C. D. Creusere et al. *A simple method for designing high-quality prototype filters for M-band pseudo QMF banks*," IEEE Transactions on Signal Processing, v. 43, no. 4, pp. 1005-1007, 1995, the contents of both of these references are incorporated by reference herein in their entirety. The impulse response for analysis filters $\mathbf{602}_n$ is then given by:

$$h_k(n) = 2h_p(n)\cos\left((2k+1)\frac{\pi}{2N}\left(n - \frac{L-1}{2}\right) + (-1)^k\frac{\pi}{4}\right)$$

where k∈[0, N−1] denotes the subband index, $h_p(n)$ is the prototype filter from Creusere, and L denotes the number of coefficients in $h_p(n)$. It should be noted that $h_k(n)$ only represents the analysis filter bank. The synthesis filter bank is unnecessary for the real-time operation of system 200 and is omitted to simplify and reduce computational complexity.

After passing through the analysis filters $\mathbf{602}_A \ldots \mathbf{602}_{N-1}$, each of the sub-banded error signals $e_0(n) \ldots e_{N-1}(n)$ is then passed through a corresponding downsampler $\mathbf{604}_A \ldots \mathbf{604}_{N-1}$ where the sub-banded error signal $e_k(n)$ is downsampled by a factor of N. Thus, if N is 4, only every $4^{th}$ digital sample is kept while the rest are discarded. The downsampled sub-banded error signals $e_{0,D}(n) \ldots e_{N-1,D}(n)$ are then provided to a multiplexer 508 where they are concatenated into a vector of error values $S_{e(n)}$. The vector of error values $S_{e(n)}$ is then passed to the adaptive filtering operation 516.

Figure 7:
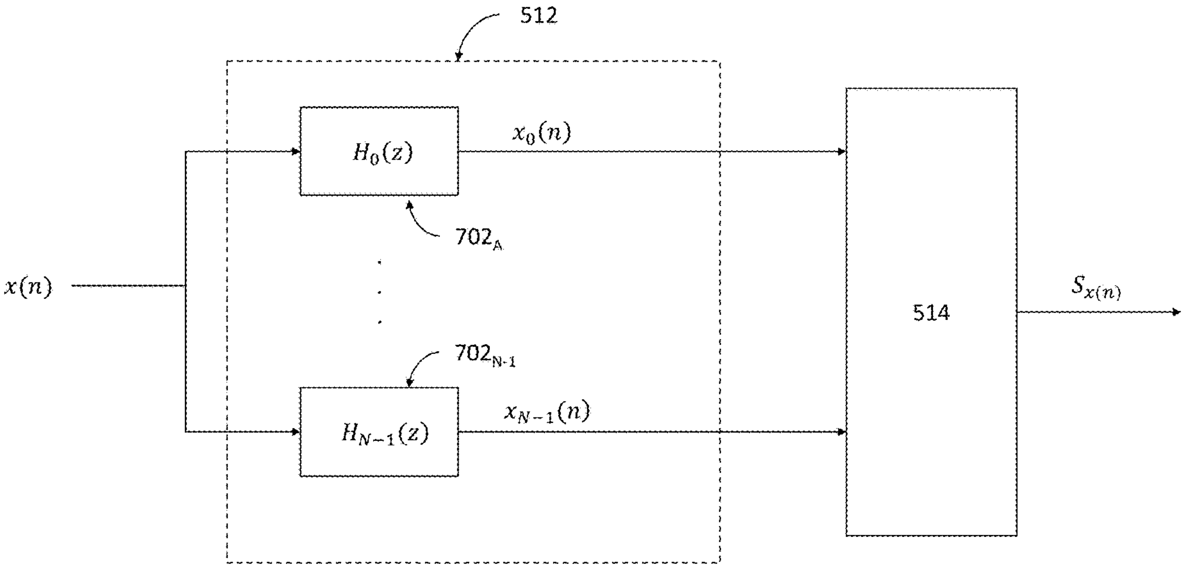
FIG. 7 is another illustration of the sub-banding and downsampling operations for one or more transmitted signals.

Returning to FIG. 5, the digital version of the transmitted signal 108A, x(n), is also sub-banded like the error signal e(n), as shown in FIG. 7. FIG. 7 illustrates the sub-banding process, 512, for the digital version, x(n), of the transmitted signal 108A. The digital transmitted signal 108A is passed through a series of analysis filters $\mathbf{702}_A \ldots \mathbf{702}_{N-1}$. In a preferred embodiment, filters $\mathbf{702}_A \ldots \mathbf{702}_{N-1}$ are the same as filters $\mathbf{602}_A \ldots \mathbf{602}_{N-1}$ and thus have the same coefficients $H_0(z) \ldots H_{N-1}(Z)$ as the filters $\mathbf{602}_A \ldots \mathbf{602}_{N-1}$. The result is a series of sub-banded transmitted signals $x_0(n) \ldots x_{N-1}(n)$ (generically $x_k(n)$). Unlike the error signal, however, in a preferred embodiment, the sub-banded transmitted signals $x_0(n) \ldots x_{N-1}(n)$ are not passed through a corresponding downsampler. Instead, the sub-banded transmitted signals $x_0(n) \ldots x_{N-1}(n)$ are provided to a multiplexer 514 where they are concatenated into a vector of values $S_{x(n)}$. The vector of values $S_{x(n)}$ is then passed to the adaptive filtering operation 516.

In the adaptive filtering operation 516, the digital transmitted signal 108A is passed through a filter comprising filter coefficients ŵ(n). The goal is to transform the digital transmitted signal 108A, x(n), into a digital approximation d̂(n) of the self-interfering signal 108B. Thus, when the digital approximation d̂(n) of the self-interfering signal 108B is subtracted from the digital version d(n) of the OA signal, the resulting signal is the SOI 110. As discussed above, however, the error signal is also defined as the difference between the digital version d (n) of the OA signal and the digital approximation d̂(n) of the self-interfering signal 108B. Thus, the error signal e(n) is the approximation of the SOI 110. As explained below, the process outlined in FIG. 5 is an iterative one where the filter coefficients ŵ(n) are repeatedly updated such that the error signal e (n) converges to a minimum or, said differently, the error signal e(n) converges to the SOI 110.

The initial values of the vector of adaptive filter coefficients ŵ(n) may be set to zero. The adaptive filter coefficients ŵ(n) are then updated by Equation 2 below:

$$\hat{w}(n) = \hat{w}^T(n-1) + \mu\sum_{k=0}^{N-1}\frac{x_k(n)}{\|x_k(n)\|^2}e_{k,D}(n) \qquad \text{Equation 2}$$

In Equation 2, N denotes the number of sub-bands, $$x_k(n) = [x_k(nN) \;\; x_k(nN-1) \;\; \ldots \;\; x_k(nN-M+1)]^T$$

is the system input vector for the kth sub-band, $e_{k,D}(n)$ is the downsampled error signal for the kth subband, M denotes the number of coefficients of the adaptive filter ŵ(n), and μ denotes the step-size. As one of ordinary skill will appreciate, the terms $x_k(n)$ and $e_{k,D}(n)$ are realized by the vectors $S_{x(n)}$ and $S_{e(n)}$ provided by multiplexers 508 and 514, respectively. Thus, the adaptive filter coefficients w(n) are updated based the previous coefficients and the outputs of multiplexers 508 and 514. The digital version, x(n), of the transmitted signal 108A is then passed through the filtering operation 516 which now has the updated adaptive filter coefficients ŵ(n) resulting in a new digital approximation d̂(n) of the self-interfering signal 108B. The new digital approximation d̂(n) of the self-interfering signal 108B is then used to generate a new error signal e(n) and the process repeats until the error signal e(n) converges to a minimum. One of the advantages of this approach is that the sub-banding and downsampling operation reduces the computational complexity and improves convergence speed.

Having explained the sub-banding and downsampling operation and how the received signals are processed by system 200 to eliminate a self-interfering signal 108B, attention will now be directed to additional embodiments of system 200. In the embodiment described above, the step-size μ dictates how quickly system 200 will converge to a minimum, or in other words how quickly system 200 will eliminate the self-interfering signal 108B to reveal the SOI 110. In conventional least means square (LMS) filtering systems, the step-size is derived from the gradient of the error signal, and it is expected and desirable for the error signal to converge to zero. However, in the presence of other in-band signals, such as SOI 110, the error signal should not converge to zero but rather to SOI 110. An approach from W.-P. Ang et al. *A new class of gradient adaptive step-size LMS algorithms*, IEEE Transactions on Signal Processing, vol. 49, no. 4, pp. 805-810, 2001, the contents of which are incorporated by reference herein in their entirety, is adapted for the situation of a self-interfering signal 108B and a SOI 110.

The fixed step-size μ in Equation 2 is replaced, in this embodiment, with $$\mu(n)=\mu(n-1)+\rho e(n)x^T(n)\varphi(n)$$

where ρ denotes a small positive constant. In a preferred embodiment, ρ is greater than 0 but less than or equal to 0.01. An exemplary value is ρ=0.005. and $$\varphi(n)=\alpha\varphi(n-1)+e(n-1)x(n-1)$$

where α is a constant smaller than but close to 1. In a preferred embodiment, α is equal to or greater than 0.99 but less than 1. An exemplary value is α=0.999. To ensure stability, i.e. that system 200 converges to the SOI 110, the variable step-size μ(n) is bounded. Specifically, a step-size:

$$\tilde{\mu}(n)=\begin{cases}\mu_{min} & \mu(n)<\mu_{min}\\ \mu_{max} & \mu(n)>\mu_{max}\\ \mu(n) & \text{otherwise}\end{cases}$$

where $\mu_{min}$ and $\mu_{max}$ denote the lower and upper bounds of μ(n), respectively. The benefit of this variable step-size approach is that it is able to dynamically increase or decrease the step-size as necessary in non-stationary channel conditions. In other words, if the error grows as a result of a time-varying channel, the step-size can increase accordingly to improve convergence and then subsequently decrease to maintain low misadjustment error. As one of ordinary skill will appreciate, misadjustment error occurs if the step-size is too large causing the filter to overshoot the optimal value and thus not converge properly to the minimal value. The error will oscillate around the optimal value without obtaining it. The difference between the value that the filter oscillates at and the true optimal value is known as the misadjustment error.

Figure 8A:
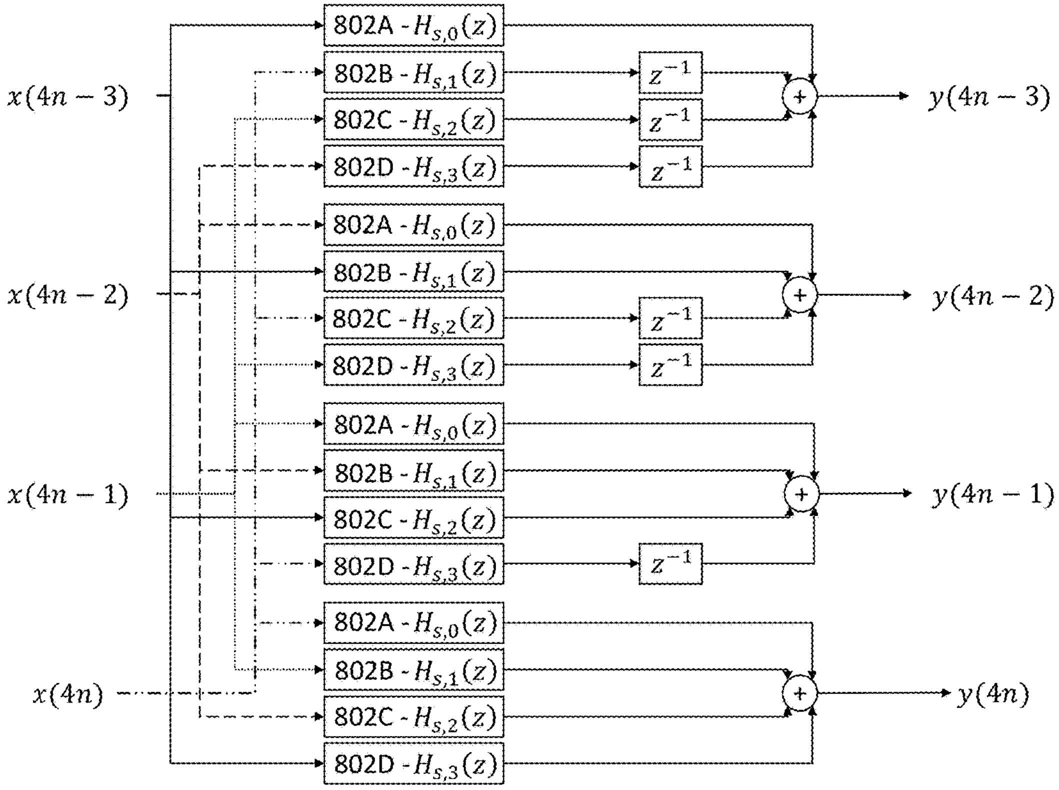
FIG. 8A illustrates parallel processing of a plurality of digital samples of the transmitted signal 108A.
Figure 8B:
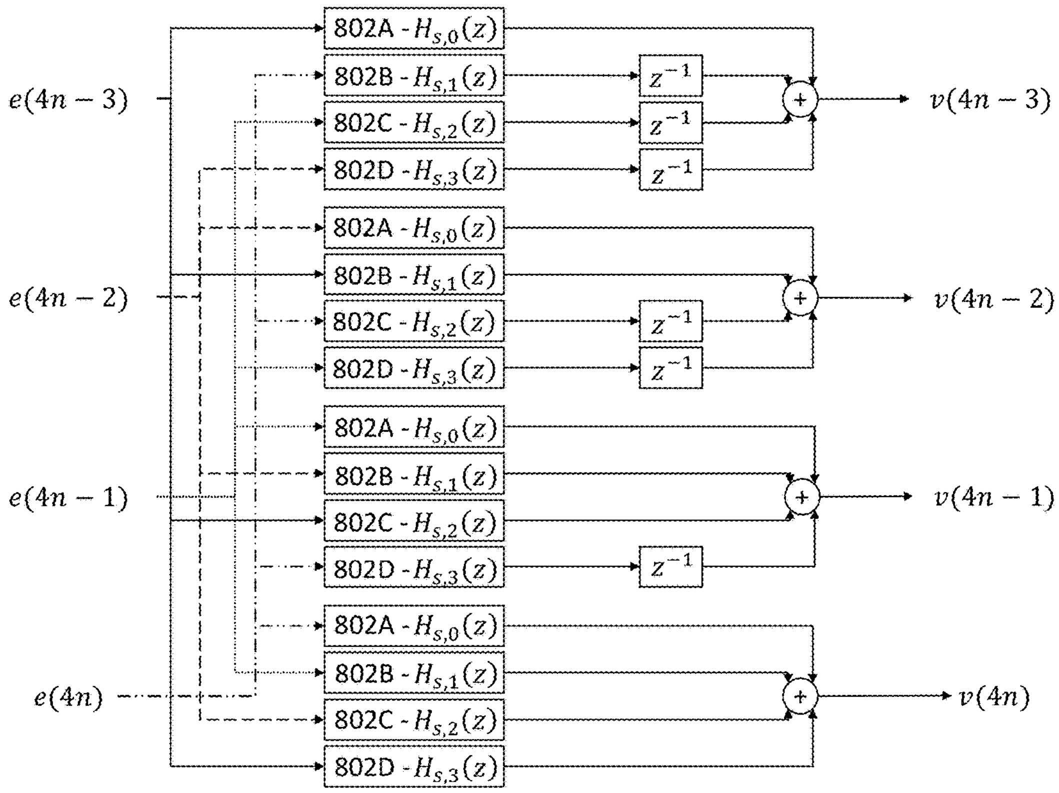
FIG. 8B illustrates parallel processing of digital samples of the error signal.

In yet another embodiment, the sub-banding and variable step-size features described above may be further combined with parallel processing of the OA signal and the transmitted signal 108A, as explained below. In the exemplary embodiments described above, only one sample of the OA signal and the transmitted signal 108A is processed at a time. A SAF that is able to process just one sample per each clock may be insufficient for 5G communications. For example, a typical maximum clock rate for an FPGA is approximately 775 MHz. Assuming that the FPGA can process one sample per clock cycle, then the maximum number of samples the FPGA can process is 775 Msps—far less than what 5G networks are capable of. When one considers that 5G communications may allow for data rates in excess of 1 Gsps, it becomes clear that an FPGA implementation of SAF 220 may be insufficient if only one data sample is processed per clock cycle. Accordingly, in another embodiment, each of the sub-band analysis filters $\mathbf{602}_A$ . . . $\mathbf{602}_{N\text{-}1}$ and $\mathbf{702}_A$ . . . $\mathbf{702}_{N\text{-}1}$ and the adaptive filter 516 are replaced by equivalent parallel finite impulse response (FIR) architectures that can process R samples per clock cycle. FIGS. 8A and 8B are exemplary.

FIG. 8A illustrates parallel processing of the digital version x(n) of the transmitted signal 108A when R=4. This means that four samples of the transmitted signal 108A, x(n), are processed simultaneously. Of course, R=4 is merely one example, as R can be set to any value. However, there are costs to higher values of R. While setting R to a value greater than 4 would allow additional samples to be processed in a given clock cycle, it would do so at the expense of additional FPGA resources. As one of ordinary skill will appreciate, as the amount of FPGA resources increase, so does the required size of the FPGA. In applications such as smartphones, tablets, and portable computers, the large size of the FPGA may be unwanted. As such, in a preferred embodiment, the number of samples processed during a given clock cycle is matched to the maximum expected data rate of the cellular network. For example, in a 5G network the maximum expected rate is approximately 2.0 Gsps. Thus, an FPGA that operates at 500 MHz, but processes 4 samples per clock can achieve a data rate of 2.0 Gsps.

Returning to FIG. 8A, a most recent sample of x(n) and the three previous samples are processed simultaneously using the parallel FIR filter architecture shown in FIG. 8A. To process those samples in parallel, it is necessary to pass each of the four samples to four sets of filter banks 802A, 802B, 802C, and 802D. In FIG. 8A, each sub-filter 802A, 802B, 802C, and 802D has a corresponding impulse response given by $$h_{s,r}(n)=[\,h_s(r)\;\;h_s(r+R)\;\;h_s(r+2R)\;\;\dots\,]^T$$

where $h_s(n)$ represents the serial FIR filter coefficients to be implemented in parallel. Equivalently, $h_s(n)$ is the impulse response for the analysis filters $\mathbf{702}_n$. In FIG. 8A, the processes labeled with $z^{-1}$ are unit delays, which delay the signal by one sample. Then, the signals are added to each other, resulting in four output samples respectively corresponding to the four input samples.

FIG. 8B illustrates parallel processing of the digital version e(n) of the error signal when R=4. It is self-evident from FIG. 8B that, in the preferred embodiment, the same filters 802A, 802B, 802C, and 802D are applied to the digital version e(n) of the error signal resulting in four outputs as shown in FIG. 8B, as described above for x(n). The outputs from the parallel processing of the R samples of the digital sample x(n) of the transmitted signal 108A and the digital sample e(n) of the error signal are used in the filtering operation 516.

Having described the subbanding, variable step-size, and parallelized processing steps, attention will now be directed to exemplary hardware for implementing SAF 220. In a preferred embodiment, SAF 220 is a real-time implementation which invites the use of an FPGA. As discussed above, the theoretical maximum FPGA clock rate, at the time of this application, is approximately 775 MHz, far too slow to achieve a data rate of 2.0 Gsps. But even if the data rate requirement was closer to 775 Msps, it is difficult to achieve the theoretical maximum FPGA clock rate when the FPGA is highly utilized. The design of system 200, however, includes several features to overcome these limitations. First, by instantiating the adaptive filter 516 only once (as shown in FIG. 5), as opposed to multiple times in a naïve implementation, the architecture of system 200 will require MR fewer multipliers resulting in a significant savings in FPGA area. Second, parallelized processing of R samples allows for a lower clock rate.

There are many feasible combinations of R and clock rate that could achieve a desired data rate. For example, if the desired data rate is 2.0 Gsps, selecting R=5 and a clock of 400 MHz or R=8 and a clock rate of 250 MHz would both achieve a data rate of 2.0 Gsps. But, as discussed above, there are tradeoffs that must be considered. Meeting FPGA timing constraints becomes more challenging as the clock rate increases. Reducing the clock rate may alleviate this, but that comes at the expense of increase the FPGA area. As FPGA area consumption increase, meeting timing constraints also becomes more challenging. Therefore, in a preferred embodiment, a clock rate of 500 MHz and R=4 samples per clock cycle is used to achieve the data rate of 2.0 Gsps by achieving an acceptable balance of clock rate and FPGA area. Additionally, in the preferred embodiment, the number of subbands N may be chosen such that N=R. In that case, the downsampling operations simply discard R−1 of the R samples being processed simultaneously, eliminating the need for multiple clock domains and clock domain crossing logic. This will be explained in further detail below.

Consider the situation where N=R=4. Four samples of the error signal e(1), e(2), e(3), and e(4) are provided to each of four filter banks $H_0(z)$, $H_1(z)$, $H_2(z)$, and $H_3(z)$, as shown in FIG. 6. Out of each set of filter banks are four signals v(1), v(2), v(3), and v(4) respectively corresponding to the four error signals e(1), e(2), e(3), and e(4) input into the filter bank, as shown in FIG. 8B. Those signals are then subjected to a downsampling operation where, if R=4, only every $4^{th}$ signal is kept and the rest are discarded. Thus, only y(4) out of each filter bank is kept while the values y(1), y(2), and y(3) are discarded. The result is a vector of $y_{H_0}(4)$, $y_{H_1}(4)$, $y_{H_2}(4)$ and $y_{H_3}(4)$ which corresponds to the $e_{k,D}(n)$ term in Equation 2 above. In a similar manner, as shown in FIG. 8A, four samples of the input signal x(1), x(2), x(3), and x(4) are processed simultaneously resulting in four signals y(1), y(2), y(3), and y(4) respectively corresponding to the four input signals x(1), x(2), x(3), and x(4) input into the filter bank. However, as shown in FIG. 7, since x(n) is not downsampled like the error signal, the resulting vector is the $x_k(n)$ term in Equation 2. The result is a new set of adaptive filter coefficients per Equation 2.

As noted above, in a preferred embodiment, the output of SAF 220 is a real-time output which invites the use of a FPGA. An exemplary FPGA is a Xilinx Virtex UltraScale+ XCVU13P or XCZU28DR, either of which may be programmed to perform the operations described above using MathWorks HDL Coder which allows a user to program the FPGA in a high-level language and automatically generate the equivalent low-level hardware description language (HDL) code. The resulting HDL code is then used by Xilinx tools to create an FPGA bitstream file. As a result, the entire design may be implemented in real-time hardware without manually writing any HDL code. FIGS. 9A and 9B show the FPGA resources consumed when features of system 200 are implemented on the XCVU13P and the XCZU28DR, respectively.

Figure 10:
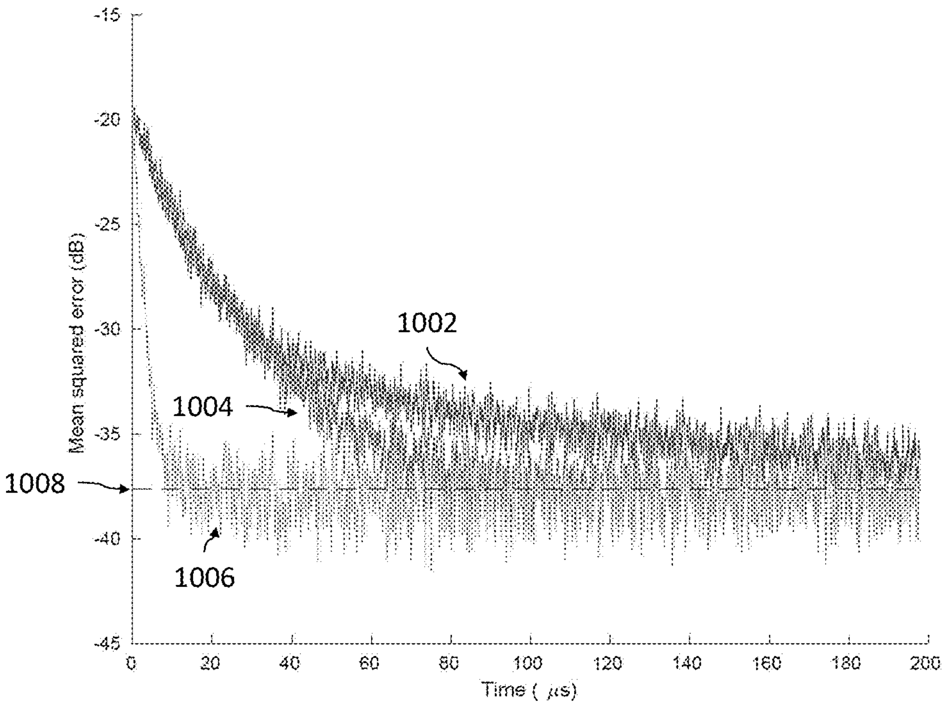
FIG. 10 is a graph illustrating the performance of embodiments of system 200 versus conventional methods.

To show the performance of system 200 in various embodiments compared to conventional algorithms, a test was employed whereby two S-band radios operating with 1.0 GHz of instantaneous bandwidth were placed at opposite ends of a 10 m×5 m anechoic chamber. A reflector mounted on a pedestal rotating at 30°/sec. was placed 3 meters away from one of the radios. The multipath delay spread due to this reflector, as well as the chamber's walls, was roughly 0.12 microseconds and thus required a 256-coefficient cancellation filter at 2.0 Gsps. System 200 was configured with the following parameters: N=4, L=32, M=256, R=4, ρ=0.005, α=0.999, $\mu_{min}$=0.001, and $\mu_{max}$=0.1. A user may use these values or change them depending on the FPGA hardware they are implementing system 200 on, the characteristics of the environment(s) in which signals are transmitted and received, and the desired self-interference cancellation performance. For example, when system 200 is implemented on a smartphone, tablet, computer, or other user interactive environment, values may be chosen on the assumption that the implementing hardware will likely be used in a dense urban environment thus ensuring adequate performance in the most challenging environment. FIG. 10 is a graph showing the mean square error (MSE) as a function of time. As one of ordinary skill will appreciate, as the system converges to a solution, the MSE reaches a minimum.

FIG. 10 shows the results of: a conventional system 1002, namely a system employing a normalized block LMS (NBLMS) algorithm, system 200 in an embodiment where a variable step-size is not employed 1004, system 200 in an embodiment where a variable step-size is employed 1006, and a theoretical minimum 1008. It is self-evident from FIG. 10, that both embodiments 1004 and 1006 of system 200 converge to an optimal minimum error quicker than the conventional system 1002, with the embodiment that employs a variable step-size 1006 converging to a solution in less than a tenth of the time of the conventional system 1002. Specifically, when system 200 employs subbanding, parallelization with R=4, and a variable step-size, it converges to 95% of the theoretical minimum MSE in 4.1 microseconds, compared to 28.5 microseconds under the same setup but with a fixed step-size instead of a variable step-size, and 33.2 microseconds for NBLMS.

Figure 11:
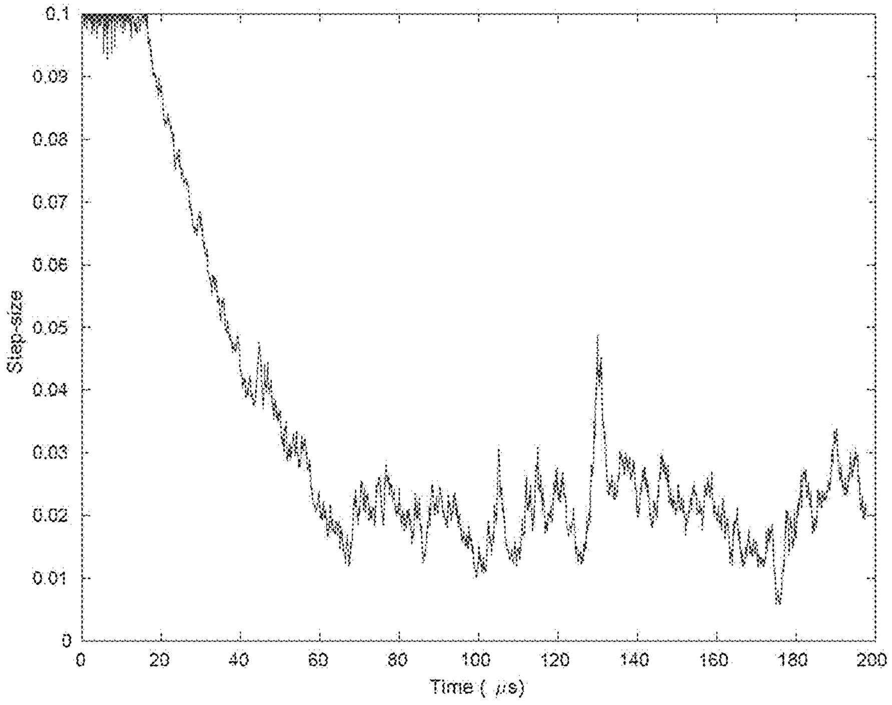
FIG. 11 is a graph of step-size as a function of time.

Finally, FIG. 11 illustrates the variable step-size for system 200 that employed a variable step-size 1006. Initially, the step-size is set to $\mu_{max}$ and remained near that value when the MSE was relatively large, but as MSE decreased with time so did the step-size.

Described above is a system 200 that employs one or more of the following features: sub-banding, variable step-size, and parallelization to mitigate self-interference in a communication device that employs full-duplex communications. By employing sub-banding and parallelization, it is now possible to processes data at a rate of, in a preferred embodiment, 2.0 Gsps, and as shown in FIG. 10 by further employing a variable step-size one can eliminate a self-interfering signal 108B and converge to a SOI 110 much quicker than with previous hardware.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method, comprising:

receiving an over-the-air signal comprising a signal-of-interest and a self-interfering signal;

digitally sampling the over-the-air signal to generate a digital over-the-air signal;

digitally sampling a transmitted signal to generate a digital transmitted signal, where the self-interfering signal is correlated to the transmitted signal;

repeating, until a mean-square error between the digital over-the-air signal and an approximation of the over-the-air signal converges to a predetermined minimum, the steps of:

(i) generating a plurality of error signals respectively corresponding to R samples of the digital over-the-air signal by, for each of the R samples, subtracting an approximation of the over-the-air signal from the corresponding digital over-the-air signal;

(i) sub-banding, in parallel, the plurality of error signals and the digital transmitted signal using an analysis filter for N sub-bands to generate a plurality of sub-banded digital error signals and a plurality of sub-banded digital transmitted signals, (ii) downsampling the plurality of sub-banded digital error signals by N to generate a plurality of downsampled sub-banded digital error signals, (iii) updating a plurality of adaptive filter coefficients based on: (i) the plurality of downsampled sub-banded digital error signals, (ii) the plurality of sub-banded digital transmitted signals, and a step-size coefficient, and (iv) updating the approximation of the over-the-air signal; and generating, when the mean square error converges to the predetermined minimum, an approximation of the signal-of-interest by subtracting a current approximation of the over-the-air signal from the digital over-the-air signal.

2. The method of claim 1, wherein the step-size coefficient is variable.

3. The method of claim 1, wherein the step-size coefficient is fixed.

4. The method of claim 1, wherein R=N.

5. An apparatus, comprising:

a field-programmable-gate-array constructed to:

receive an over-the-air signal comprising a signal-of-interest and a self-interfering signal;

digitally sample the over-the-air signal to generate a digital over-the-air signal;

digitally sample a transmitted signal to generate a digital transmitted signal, where the self-interfering signal is correlated to the transmitted signal;

repeatedly, until a mean-square error between the digital over-the-air signal and an approximation of the over-the-air signal converges to a predetermined minimum, perform the following:

(i) generate a plurality of error signals respectively corresponding to R samples of the digital over-the-air signal by, for each of the R samples, subtracting an approximation of the over-the-air signal from the corresponding digital over-the-air signal;

(i) sub-band, in parallel, the plurality of error signals and the digital transmitted signal using an analysis filter for N sub-bands to generate a plurality of sub-banded digital error signals and a plurality of sub-banded digital transmitted signals, (ii) downsample the plurality of sub-banded digital error signals by N to generate a plurality of downsampled sub-banded digital error signals, (iii) update a plurality of adaptive filter coefficients based on: (i) the plurality of downsampled sub-banded digital error signals, (ii) the plurality of sub-banded digital transmitted signals, and a step-size coefficient, and (iv) update the approximation of the over-the-air signal; and generate, when the mean square error converges to the predetermined minimum, an approximation of the signal-of-interest by subtracting a current approximation of the over-the-air signal from the digital over-the-air signal.

6. The apparatus of claim 5, wherein the step-size coefficient is variable.

7. The apparatus of claim 5, wherein the step-size coefficient is fixed.

8. The apparatus of claim 5, wherein R=N.

* * * * *